US009423030B2

(12) United States Patent
Klousia et al.

(10) Patent No.: US 9,423,030 B2
(45) Date of Patent: Aug. 23, 2016

(54) OUTER PIN SEAL

(75) Inventors: Timothy Allen Klousia, Dubuque, IA (US); Mark Wayne Stender, Dubuque, IA (US); Matthew Edward Banowetz, Cedar Rapids, IA (US); Orena Dee Young, Mount Vernon, IA (US); Jeffery Frank Olsen, South Jordan, UT (US)

(73) Assignee: Deere & Company, Moline, IL (US)

( * ) Notice: Subject to any disclaimer, the term of this patent is extended or adjusted under 35 U.S.C. 154(b) by 835 days.

(21) Appl. No.: 12/597,811

(22) PCT Filed: Apr. 25, 2008

(86) PCT No.: PCT/US2008/005411
§ 371 (c)(1),
(2), (4) Date: Mar. 5, 2010

(87) PCT Pub. No.: WO2009/008941
PCT Pub. Date: Jan. 15, 2009

(65) Prior Publication Data
US 2012/0286477 A1    Nov. 15, 2012

Related U.S. Application Data

(60) Provisional application No. 60/914,480, filed on Apr. 27, 2007.

(51) Int. Cl.
| F16J 15/00 | (2006.01) |
| F16J 15/08 | (2006.01) |
| E02F 3/36  | (2006.01) |
| E02F 9/00  | (2006.01) |

(52) U.S. Cl.
CPC ........... *F16J 15/0887* (2013.01); *E02F 3/3604* (2013.01); *E02F 9/006* (2013.01); *Y10T 29/49826* (2015.01)
USPC ........................................................ 277/500

(58) Field of Classification Search
CPC ....... F16J 15/164; F16J 15/3412; F16J 15/16; F16J 15/0087; E02F 3/3604; E02F 9/006; Y10T 29/49826
USPC ......... 277/348, 399, 500, 306, 307, 309, 546, 277/631, 632, 277; 285/272, 273, 410, 420, 285/336
See application file for complete search history.

(56) References Cited

U.S. PATENT DOCUMENTS

| 4,190,378 A |   | 2/1980 | Stecklein |
| 4,234,198 A | * | 11/1980 | Martin et al. .................. 277/598 |
| 4,361,335 A |   | 11/1982 | Vinciguerra |
| 4,417,735 A | * | 11/1983 | Heisler ........................ 277/608 |

(Continued)

FOREIGN PATENT DOCUMENTS

| JP | 54 182 766 | * | 6/1978 |
| JP | 54-182766 |   | 6/1978 |

(Continued)

OTHER PUBLICATIONS

European Search Report, Oct. 21, 2011, 5 pages.

*Primary Examiner* — Kristina Fulton
*Assistant Examiner* — Nathan Cumar
(74) *Attorney, Agent, or Firm* — Faegre Baker Daniels, LLP

(57) ABSTRACT

A seal (200) of substantially wedge shaped cross section self adjusts and seals pivot joints (100) over a range of gap widths to be sealed.

23 Claims, 6 Drawing Sheets

(56) References Cited

U.S. PATENT DOCUMENTS

| | | | | |
|---|---|---|---|---|
| 4,772,150 A | * | 9/1988 | Horton | 403/39 |
| 5,571,268 A | * | 11/1996 | Azibert | 277/382 |
| 7,367,739 B2 | * | 5/2008 | Brock et al. | 403/39 |
| 2008/0231110 A1 | * | 9/2008 | Mulligan et al. | 305/103 |

FOREIGN PATENT DOCUMENTS

| | | | |
|---|---|---|---|
| JP | 59 047 767 | * | 3/1984 |
| JP | 59-47767 | | 3/1984 |
| WO | WO2004036070 A1 | | 4/2004 |

* cited by examiner

OUTER PIN SEAL

CROSS REFERENCE TO RELATED APPLICATIONS

The present application is a nationalization under 35 U.S.C. §371 of International Application No. PCT/US2008/005411, filed Apr. 25, 2008, titled "Outer Pin Seal," which claims the benefit of U.S. Provisional Application Ser. No. 60/914,480, filed Apr. 27, 2007, the disclosures of which are expressly incorporated by reference herein.

FIELD OF THE INVENTION

The invention relates, generally, to seals for pivot joints used to look patiently connect mechanical parts and, more particularly, to outer seals for pins and bushings that rotation only connect linkages and work tools on work vehicles.

BACKGROUND OF THE INVENTION

Pivot joints used in the linkages of work vehicles such as, for example, loader backhoes and four wheel drive loaders include pins and bushings to allow relative rotation between connected parts. These pivot joints conventionally include seals between the pins and the bushings as barriers to debris. However, due to the harsh environments in which these vehicles are used, i.e., environments having significant amounts of dirt and debris, dirt and debris tend to get past these barriers and cause accelerated wear of the pivot joints.

Some manufacturers of work vehicles have sought to remedy the difficulties outlined above by forming pre-barriers, i.e., a first line of defense against debris, via o-rings located between outer surfaces of the connected portions of linkages and work tools as shown in FIGS. 6 and 6A. However, this approach has led to at least the following two difficulties: (1) the o-rings are typically round, allowing dirt and debris to eventually work past the o-ring and into the space between the pins and bushings; and (2) the o-rings wear and their eventual replacement requires disconnection of the rotationally connected parts, a substantial expense with respect to time and money.

SUMMARY OF THE INVENTION

Described herein is a device and method for sealing a pivot joint against dirt and debris that significantly reduces the difficulties addressed above. The rotationally connected parts of the pivot joint include a first member having an external surface with a substantially circular cross section in a plane perpendicular to the longitudinal axis of the pin and a second member having an external surface substantially orthogonal to the longitudinal axis. The seal has a cross section that is substantially wedge shaped. One corner of the wedge fits into a gap between the external cylindrical surface of the first member while the remaining corners span the gap between these surfaces. Each of the remaining corners spanning the gap may include lips for completing the sealing function of the device and for adjusting to variations in the size of the gap. The seal is split, having a first end and a second end such that when the first and second ends are joined, it, i.e., the seal, substantially forms a circle. At each end, the seal includes a connecting portion. In one embodiment, the connecting portion is on the seal's outer diameter and integral to the wedge. The first and second ends are generally joined via a connector such as, for example, a screw.

In practice, an accommodating portion of the external surface of the first member is shaped to conform to the shape and angle of one side of the wedge. Once the pivot joint is assembled, the seal is connected such that it fills a gap between the first member and the second member, where the one side of the wedge rides along the accommodating portion of the external surface of the first member and the lips of the seal ride along the external surface of the first member and the external surface of the second member. The seal is dimensioned to accommodate a relatively wide range of gaps in tension.

BRIEF DESCRIPTION OF THE DRAWINGS

The invention will be described in detail, with references to the following figures, wherein.

DESCRIPTION OF THE ILLUSTRATED EMBODIMENT

Figure 1:
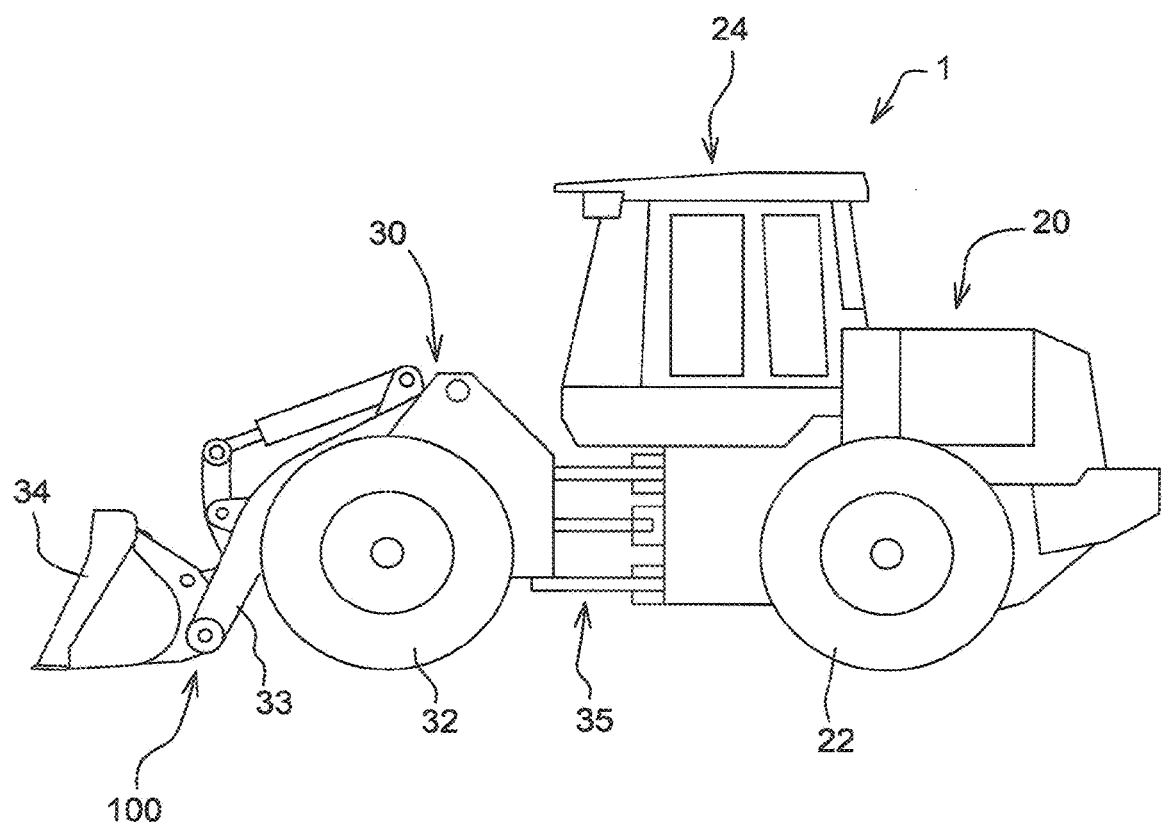
FIG. 1 is a view of a work vehicle in which the invention may be used.

FIG. 1 illustrates a work vehicle in which the invention may be used. The particular work vehicle illustrated is a four-wheel-drive loader 1 having a rear portion 20, a front portion 30, a pivot 35 between the rear portion 20 in the front portion 30, a cab 24, of boom 33, a bucket 34, and a pivot joint 100 rotationally connecting the boom 33 and the bucket 34.

Figure 2:
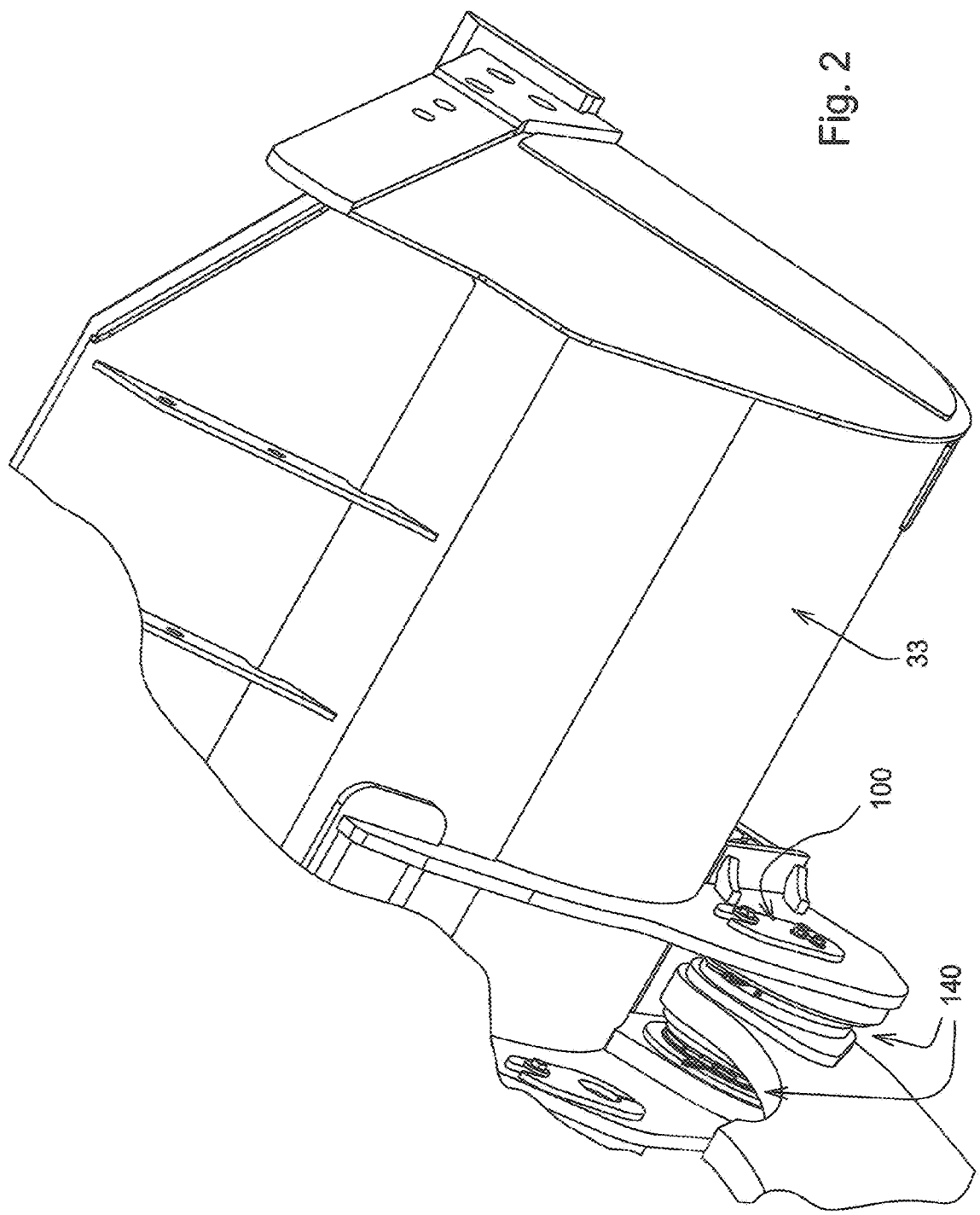
FIG. 2 is an oblique view of the front of the work vehicle illustrated in FIG. 1.
Figure 3:
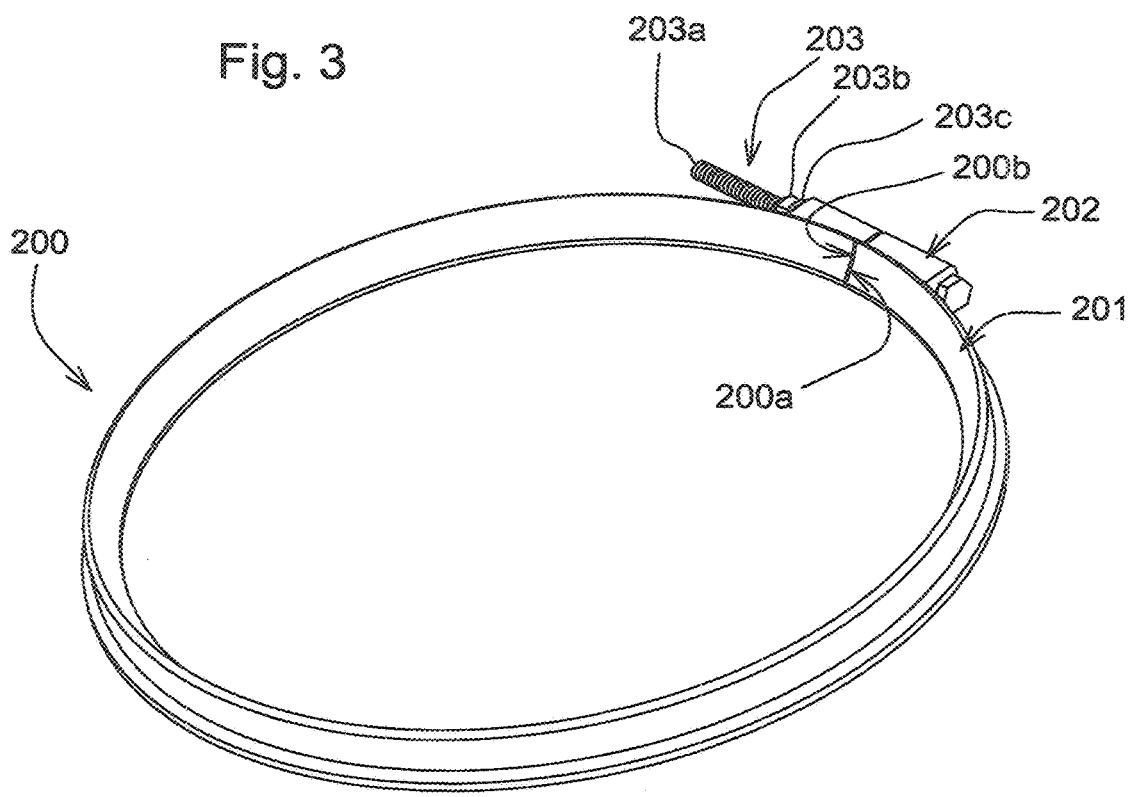
FIG. 3 is an oblique view of the outer pin seal.
Figure 4:
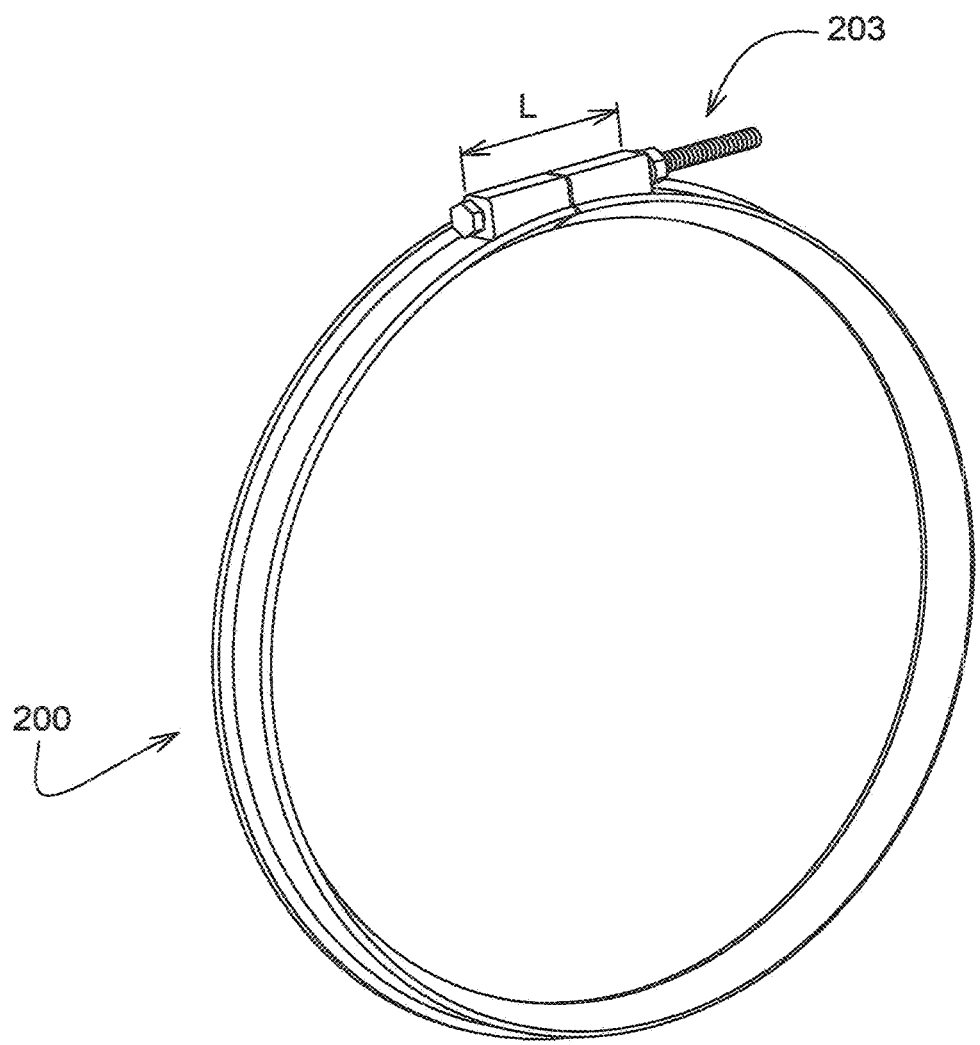
FIG. 4 is another oblique view of the outer pin seal.

While the outer pin seal, i.e., the invention, will work on practically any appropriately configured pivot joint, we will focus on the pivot joint 100 as illustrated in FIG. 2 which employs a greaseless bushing 140. FIGS. 3 and 4 provide oblique views of one embodiment of the invention which is first line defense seal 200. Greaseless style bushings require many levels of sealing to ensure bushing life. In this particular case, the first line defense seal 200 is the exterior seal at the boom to bucket joint, i.e., the pivot joint 100, which is exposed to abrasive chemicals and extreme environmental/operating conditions and is required to keep debris out of the joint. Due to manufacturing limitations, dimensional variations between parts require the seal to be effective over gaps of considerable range. In this particular instance the seal needs to span gaps ranging from, for example, 1 mm to 12 mm. Thus, the first line defense seal 200 is required to be adjustable, i.e., to effectively seal gaps of considerable range without falling into the pivot joint 100 during operation. The first line defense seal 200 is also required to last the life of the joint of 15,000 hours.

As illustrated in FIGS. 3 and 4, the first line defense seal 200 includes a first end 200a, a second end 200b, a first portion 201, a second portion 202 and a connector 203. The first line defense seal 200 may be constructed of any material of suitable flexibility and durability and may also contain self lubricating materials such as, for example molybdenum disulfide. The first line defense seal 200 be of the greaseless type as described above or may require the application of a lubricant.

Figure 5:
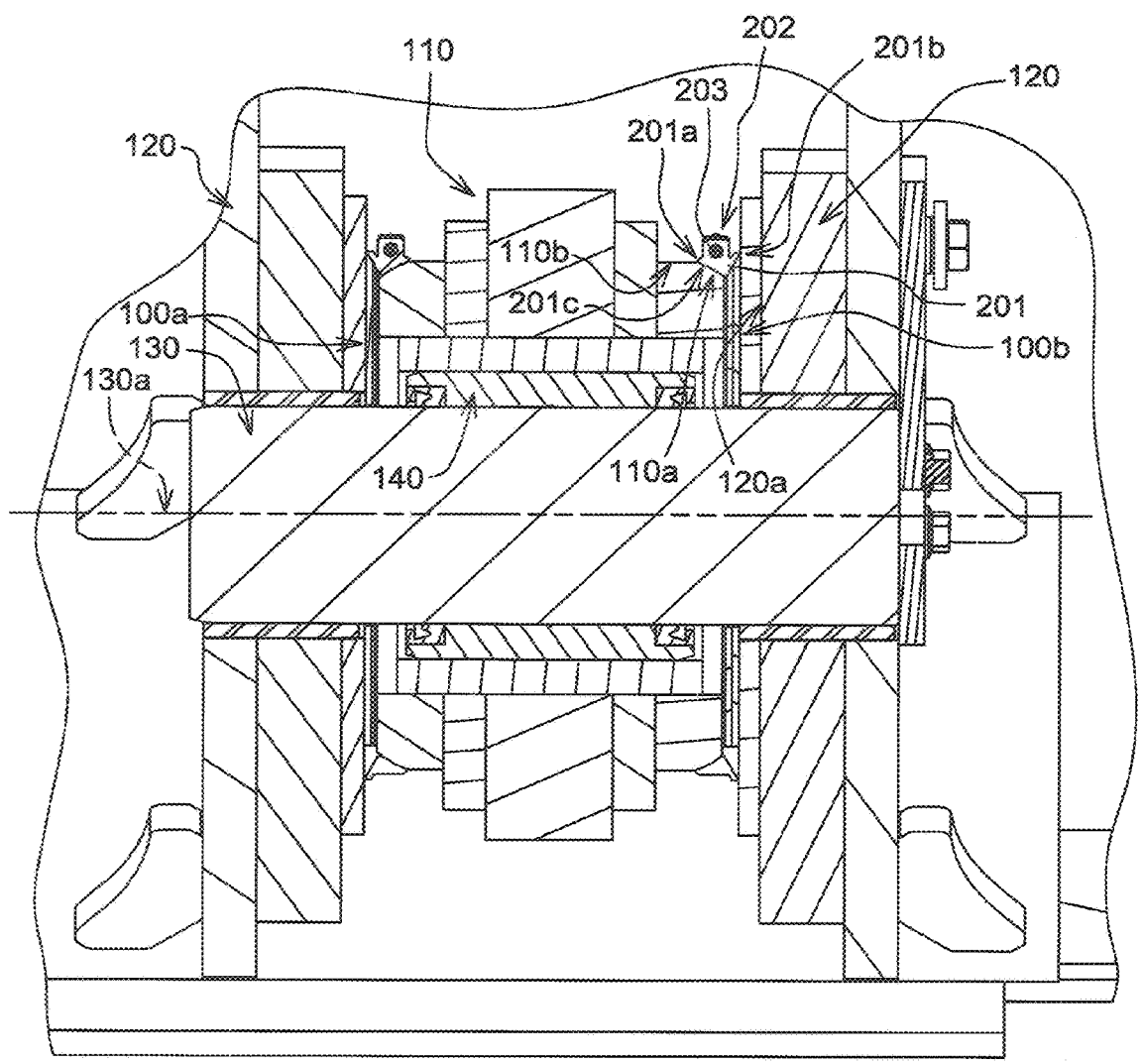
FIG. 5 is a cross-sectional view of the joint illustrated in FIG. 2 including the outer pin seals.
Figure 6:
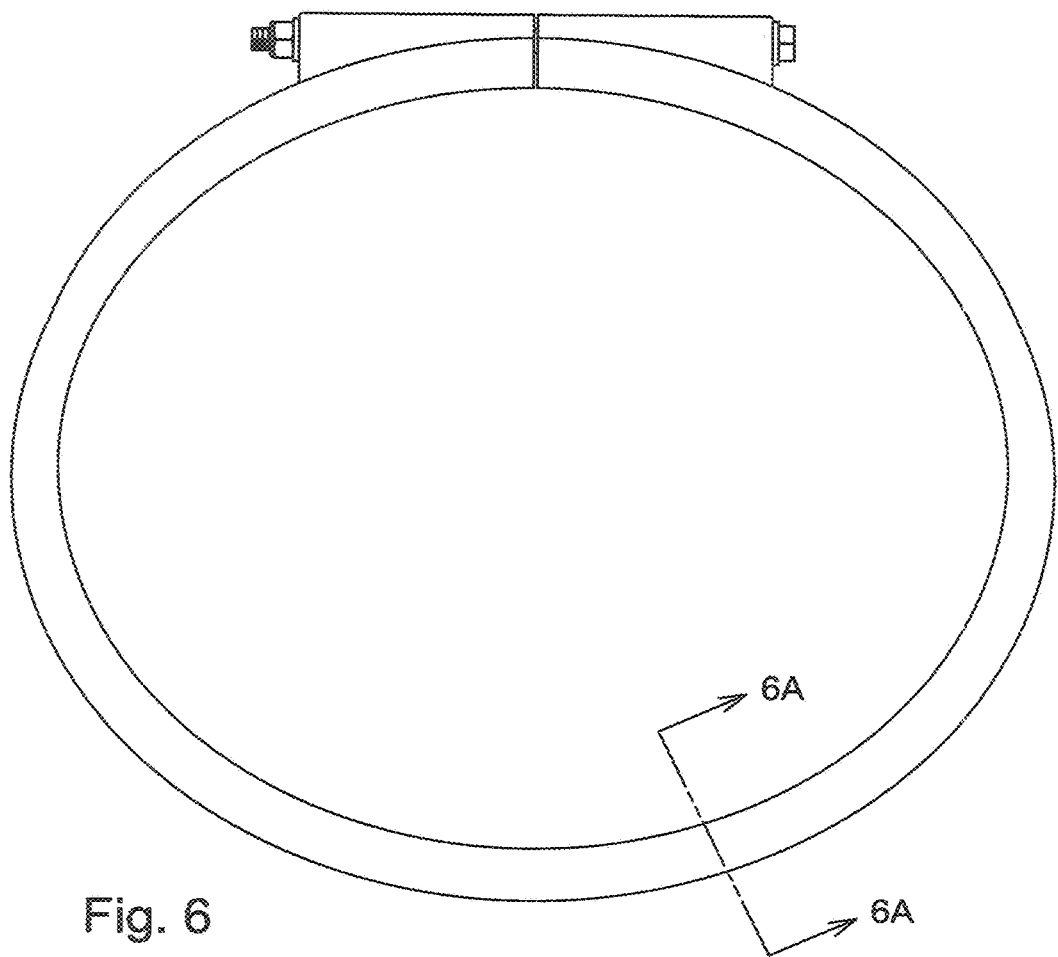
FIG. 6 is an oblique view of a conventional seal.
Figure 6A:
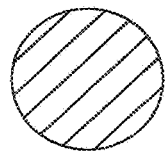
FIG. 6A is a cross-sectional view of FIG. 6.

FIG. 5 illustrates a cutaway view of one embodiment of the invention, i.e., first-line defense seal 200 as it is used to protect pivot joint 100 which includes a first member 110, a second member 120, a pin 130, and a bushing 140. As illustrated in FIGS. 3, 4, and 5, the first line defense seal 200 includes: a wedge shaped first portion 201 which includes lips 201a and 201b; a second portion 202; a first end 200a; a second end 200b; and a connector 203, comprising a bolt 203a, a nut 203b, and spacers 203c as required. As illustrated in FIG. 5, exemplarily, a first external surface 110a of the first member 110 substantially conforms to a first portion surface 201c of the first portion 201 of the first line defense seal 200. As illustrated, lip 201a contacts a second external surface 110b of the first member 110 and lip 201b seals a circular external surface 120a of the second member 120. The circular external surface 120a is substantially flat and orthogonal to the longitudinal axis 130a of the pin 130. The first external surface 110a is conical, i.e., at an angle that is oblique to the second external surface 110b. The second external surface 110b is cylindrical in shape.

In practice, the first line defense seal 200 is placed around the gap 100b as shown in FIG. 5 and connected via connector 203. Bolt 203a has an unthreaded length that provides a length L sufficiently short to close the first line defense seal 200 so as to provide an effective barrier to environmental contaminants and sufficiently long to avoid unduly distorting the seal 200 when tightened down.

Once the first line defense seal 200 is tightened down, the first portion surface 201c rides along the first external surface 110a while lip 201a contacts the second external surface 110b of the first member 110 and lip 201b contacts the circular external surface 120a of the second member 120. The first line defense seal 200 is always in some degree of tension in the sealed pivot joint 100. Due to the shape of the first member contacting surface 110a, which is, exemplarily, a chamfer in this case, the seal 200 will tend to seek a setting of the lease tension when it is connected as it will self adjust along the first member contacting surface 110a as dimensions of first member 110, the second member 120 and the gap 100b vary. As the gap 100b varies, the lips 201a, 201b aid in the self adjustment of the seal 200 as they tend to flex and relax as necessary to seal the gap 100b. As the outer diameters of the first external surface 110a and the second external surface 110b increase and decrease, the seal 200 tends to self adjust by positioning itself down and up along the first member contacting surface correspondingly.

Having described the illustrated embodiment, it will become apparent that various modifications can be made without departing from the scope of the invention as defined in the accompanying claims.

The invention claimed is:

1. A seal for a pivot joint, the pivot joint including a pivot pin and a bushing, the pivot joint rotationally connecting a first member and a second member,
   the first member having a longitudinal axis, a substantially conical external surface, and a substantially cylindrical external surface adjacent the substantially conical external surface, the substantially conical external surface having a cross section that is substantially circular on a first plane orthogonal to the longitudinal axis,
   the second member having a circular external surface that is substantially flat and substantially orthogonal to the longitudinal axis,
   a gap being defined axially between the substantially conical external surface of the first member and the circular external surface of the second member, and the gap being defined radially inward of the substantially cylindrical external surface,
   the seal comprising:
   a body defining a circle in a second plane orthogonal to the longitudinal axis, the body having a cross sectional shape generally conforming to that of a triangle,
      a first outer diameter of the body formed by a first corner of the triangle,
      a second outer diameter of the body formed by a second corner of the triangle, the second outer diameter being greater than the first outer diameter, a lip at the second corner,
      an inner diameter of the body formed by a third corner of the triangle, a first seal surface extending between the third corner and the first corner, the lip including a second seal surface,
   an outer surface extending between the first corner and the second corner,
   a majority of the body of the seal being positioned in the gap, with the lip extending from the outer surface radially outwardly away from the substantially cylindrical external surface of the first member.

2. The seal of claim 1, wherein the seal is connected over the axial gap between the substantially conical external surface and the circular external surface such that the gap is sealed, the seal fitting around a circumference of the substantially conical external surface of the first member.

3. The seal of claim 2, wherein the first seal surface contacts the substantially conical external surface.

4. The seal of claim 3, wherein the lip contacts the circular external surface.

5. The seal of claim 1, wherein the outer surface of the seal is substantially parallel to the longitudinal axis.

6. The seal of claim 1, wherein the outer surface of the seal is substantially parallel to the substantially cylindrical external surface of the first member.

7. The seal of claim 1, further comprising:
   a portion along an arc of the circle and positioned along the outer diameter, the portion having the effect of thickening the seal along the arc, the portion and the body being integral, the portion and the body being split in a plane parallel to the longitudinal axis such that the body has a first end and a second end and the portion has a first end and a second end, a length of the portion along the arc being greater than a width of the body; and
   a fastener for connecting the first end of the body and the second end of the body and for connecting the first end of the portion and the second end of the portion.

8. The seal of claim 1, wherein the lip is adapted to flex to maintain a sealing of the pivot joint during dimensional variations of the gap of the pivot joint.

9. The seal of claim 1, wherein the lip defines a blunt tip at the second corner.

10. A method of using a seal to seal a pivot joint, the pivot joint including a pivot pin and a bushing, the pivot joint rotationally connecting a first member and a second member,
   the first member having a longitudinal axis, a substantially conical external surface, and a substantially cylindrical external surface adjacent the substantially conical external surface, the substantially conical external surface having a cross section that is substantially circular about a first plane orthogonal to the longitudinal axis,
   the second member having a circular external surface that is substantially flat and substantially orthogonal to the longitudinal axis,
   a gap being defined axially between the substantially conical external surface of the first member and the circular external surface of the second member, and the gap being defined radially inward of the substantially cylindrical external surface, the seal including:
a seal body forming a circular construct, the seal body having a cross sectional shape generally conforming to that of a triangle, respective outer diameters of the circular construct defining circles orthogonal to the longitudinal axis and formed by a first corner and a second corner of the triangle, a lip at the second corner, an inner diameter of the circle formed by a third corner of the triangle, a first seal surface extending between the third corner and the first corner, a second seal surface extending between the third corner and the second corner, and a second portion along an arc of the circle and positioned along the outer diameters, the second portion having the effect of thickening the seal along the arc, a length of the second portion along the arc being greater than a width of the first portion, the method comprising:
placing the seal of cross-sectional triangular shape across the gap between the first external surface and the circular external surface such that the first external surface contacts the first seal surface and the circular external surface contacts the second corner and such that a majority of the seal body is positioned in the gap.

11. The method of claim 10, wherein an outer surface of the seal extends between the first and second corners of the triangle and is substantially parallel to the longitudinal axis.

12. The method of claim 10, wherein an outer surface of the seal is substantially parallel to the substantially cylindrical external surface.

13. A seal for a pivot joint, the pivot joint rotationally connecting a first member and a second member, the first member having a longitudinal axis and a substantially conical external surface, the substantially conical external surface having a cross section that is substantially circular on a first plane orthogonal to the longitudinal axis, the second member having a second external surface that is substantially orthogonal to the longitudinal axis, the seal comprising:
a body forming a circle in a second plane orthogonal to the longitudinal axis, the body having a cross sectional shape including three corners,
a first outer diameter of the body formed by a first corner,
a second outer diameter of the body formed by a second corner, the second outer diameter being greater than the first outer diameter, a lip at the second corner,
an inner diameter of the body formed by a third corner, a first seal surface extending between the third corner and the first corner,
the lip including a second seal surface, an outer surface of the body extending between the first corner and the lip, the outer surface and the lip cooperating to form an obtuse angle.

14. The seal of claim 13, wherein the lip includes a first lip surface and a second lip surface, an angle between the first lip surface and the second lip surface being greater than 180 degrees.

15. The seal of claim 14, wherein the second seal surface extends from the second lip surface of the lip.

16. The seal of claim 14, wherein the outer surface of the body extends from the first corner to the first lip surface of the lip, and the outer surface and the first lip surface form the obtuse angle.

17. The seal of claim 13, further including an inner surface extending between the third corner and the second corner, the second seal surface of the lip forming a portion of the inner surface.

18. The seal of claim 13, wherein at least one corner of the body is blunt.

19. The seal of claim 13, wherein the first seal surface has an arced profile.

20. The seal of claim 19, wherein the first seal surface is concave.

21. The seal of claim 13, wherein the outer surface is flat.

22. The seal of claim 21, wherein the outer surface is parallel to the longitudinal axis.

23. The seal of claim 13, wherein the seal is positioned in a gap defined axially between the substantially conical external surface and the second external surface, the first seal surface contacts the substantially conical external surface, and the second seal surface of the lip contacts the second external surface.

* * * * *